(12) United States Patent
Guibene et al.

(10) Patent No.: US 11,899,767 B2
(45) Date of Patent: *Feb. 13, 2024

(54) METHOD AND APPARATUS FOR MULTIFACTOR AUTHENTICATION AND AUTHORIZATION

(71) Applicant: Charter Communications Operating, LLC, St. Louis, MO (US)

(72) Inventors: Wael Guibene, Denver, CO (US); Hossam Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,252

(22) Filed: Jul. 19, 2022

(65) Prior Publication Data
US 2022/0353259 A1 Nov. 3, 2022

Related U.S. Application Data

(63) Continuation of application No. 16/806,329, filed on Mar. 2, 2020, now Pat. No. 11,431,705.

(51) Int. Cl.
*H04L 9/40* (2022.01)
*G06F 21/32* (2013.01)
(Continued)

(52) U.S. Cl.
CPC ............ *G06F 21/32* (2013.01); *G06F 40/295* (2020.01); *G06V 30/413* (2022.01); *G06V 40/16* (2022.01);
(Continued)

(58) Field of Classification Search
CPC ............... G06F 21/32; G06F 40/295; G06F 2221/2141; G06F 21/35; G06V 30/413; G06V 40/16; G06V 40/172; G06V 40/45; G06V 30/10; G06V 40/40; H04L 63/0861; H04L 2463/082; H04L 9/40; H04W 4/021
See application file for complete search history.

(56) References Cited

U.S. PATENT DOCUMENTS 10,027,883 B1 7/2018 Kuo et al.
10,853,791 B1 * 12/2020 Ellis ................. G06Q 20/325
(Continued)

*Primary Examiner* — Quazi Farooqui
(74) *Attorney, Agent, or Firm* — Young Basile Hanlon & MacFarlane, P.C.

(57) ABSTRACT

Methods and systems for multifactor authentication and authorization are described. A method includes receiving captured image data of a person with a badge needing access to a secure area, detecting at least two faces from the captured image data, identifying a first name based on matching a face associated with a live human face with a control face in a database, identifying a second name based on matching on another face associated with the badge with a control face in a database, performing character recognition on text associated with the another face, comparing the second name with the character recognized text, comparing the second name with the first name when the second name matches the character recognized text, checking access rights, checking for at least another person in a proximity of the secure area, and granting access when the person is sole person accessing the secure area.

20 Claims, 5 Drawing Sheets

(51) Int. Cl.
  *G06F 40/295* (2020.01)
  *G06V 30/413* (2022.01)
  *G06V 40/40* (2022.01)
  *G06V 40/16* (2022.01)
  *H04W 4/021* (2018.01)
  *G06V 30/10* (2022.01)

(52) U.S. Cl.
  CPC ............ *G06V 40/172* (2022.01); *G06V 40/45* (2022.01); *H04L 63/0861* (2013.01); *H04W 4/021* (2013.01); *G06F 2221/2141* (2013.01); *G06V 30/10* (2022.01); *H04L 2463/082* (2013.01)

(56) References Cited

U.S. PATENT DOCUMENTS

| | | | |
|---|---|---|---|
| 11,562,055 B2* | 1/2023 | Tussy | G06V 40/67 |
| 2014/0369570 A1 | 12/2014 | Cheikh et al. | |
| 2017/0012981 A1* | 1/2017 | Obaidi | H04L 63/20 |
| 2019/0362572 A1* | 11/2019 | Amuduri | G07C 9/27 |
| 2021/0133185 A1* | 5/2021 | Séguin | G06F 16/245 |

* cited by examiner

METHOD AND APPARATUS FOR MULTIFACTOR AUTHENTICATION AND AUTHORIZATION

CROSS REFERENCE TO RELATED APPLICATION

This application is a continuation of U.S. patent application Ser. No. 16/806,329, filed on Mar. 2, 2020, of which is incorporated herein by reference.

TECHNICAL FIELD

This disclosure relates to access control. More specifically, this disclosure relates to providing multifactor authentication and authorization.

BACKGROUND

Access to controlled areas including secure rooms, vaults, pharmacy cabinets, factories, and the like that secure high value assets is implemented using authentication and authorization techniques. For example, factories need to properly recognize and authorize workers that have different access authorizations. Current industry standards require single authentication, which is nominally implemented using a badge. However, badges have security issues. Counterfeit badges can be used, badges may be swapped, and unauthorized use of the badges may occur. Systems generally are unable to recognize badge swapping or unauthorized badge use if the badge issue is not reported by employees. For example, if a badge is stolen and is not reported in due time, unauthorized people can access highly sensitive data. In addition, even when the badge is used by the assigned person, tail gating may occur. That is, another person can enter into the controlled area by following a properly badged person with access to the controlled area.

SUMMARY

Disclosed herein are methods and systems for multifactor authentication and authorization. In implementations, a method for multifactor authentication and authorization includes receiving captured image data of a person with a badge needing access to a secure area, detecting at least two faces from the captured image data, identifying a first name based on matching a face associated with a live human face with a control face in a database, identifying a second name based on matching on another face associated with the badge with a control face in a database, performing character recognition on text associated with the another face, comparing the second name with the character recognized text, comparing the second name with the first name when the second name and the character recognized text match, checking access rights for a matched name, checking for at least another person in a proximity of the secure area when the person has access rights for the secure area, and granting access when the person is sole person accessing the secure area.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
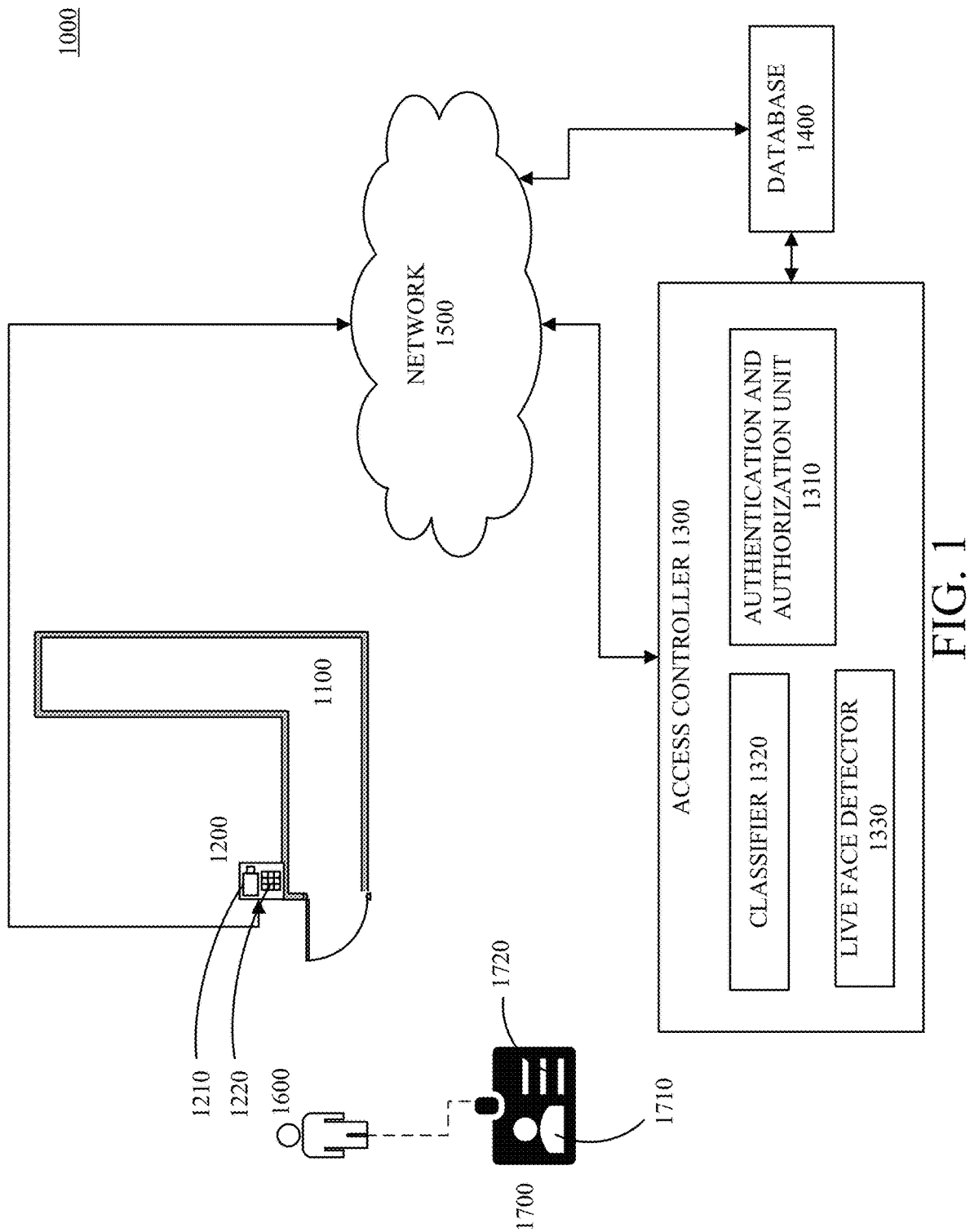
FIG. 1 is a diagram of an example architecture and system for multifactor authentication and authorization in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods, devices and systems for multifactor authentication and authorization. In implementations, the multifactor authentication and authorization technique includes authenticating a live person and authenticating a badge at a photo level and at a name level. Authentication of the live person can include analyzing a video stream to determine eye movement and blinking activity. Authentication results from the live person and the badge are compared to confirm identity. In implementations, the video stream is analyzed for a potential person or people that may be attempting to obtain access by following the authenticated person. In this instance, access is denied to all parties.

In implementations, an access controller receives video streams from image capture devices situated at restricted areas of a person desiring access to a restricted area. A classifier can be used for detecting faces in the video stream. In implementations, two faces are detected, a potentially live human face and a face on a badge. Analysis of whether there are fluctuations in the area containing the eyes can be used to determine if it is a live human face. These fluctuations can include, for example, whether the eye is moving up, down, left, right, eyelid movement, or combinations thereof. Confirmed live human faces are then processed for face recognition or person identification. Analysis of badge is threefold, processing of the face for face recognition or person identification and processing of the text for name identification. In implementations, optical character recognition (OCR) can be used to determine the name, which is then checked against a database. The results of the face recognition and the name identification are then compared for a match. The results of the face recognition for the live human face and the badge authentication are then compared for a match. This provides a multifactor authentication process. In implementations, the multifactor authenticated person is then reviewed for access rights. In implementations, surroundings of the multifactor authenticated and authorized person are reviewed for tail gating individuals.

In implementations, the multifactor authentication and authorization technique confirms that a live human face matches a face in a database for a first level authentication, a badge matches a face in the database for a second level authentication, the badge matches a name in the database for a third level authentication, the second level authentication matches the third level authentication for a fourth level authentication, and the first level authentication matches the fourth level authentication for a fifth level authentication.

In implementations, the multifactor authentication and authorization system provides protection against persons attempting to access restricted areas by following an authenticated and authorized person. The multifactor authentication and authorization system reviews a defined area around the authenticated and authorized person. Any additional person or people in the defined area results in access denial for the authenticated and authorized person and consequently any person or people in the defined area. In implementations, the multifactor authentication and authorization system can invalidate the multifactor authentication and authorization process at any time if there are multiple individuals in the defined area.

In an implementations, the multifactor authentication and authorization system provides supplementary authentication measures including fingerprints, iris identification, radio frequency identification (RFID), other biometric identifiers, and the like. Each can be confirmed against a database.

FIG. 1 is a diagram of an example architecture or system 1000 in accordance with some embodiments of this disclosure. In implementations, the architecture or system 1000 can be deployed, provided, or implemented in offices, rooms, vaults, cabinets, medical facilities, and other secure or restricted areas. In an implementation, the architecture 1000 can a secure area 1100, an access device 1200, an access controller 1300, a database 1400, and a network 1500. The access controller 1300 can include an authentication and authorization unit 1310, a classifier 1320, and a live face detector 1330. In implementations, the authentication and authorization unit 1310, the classifier 1320, and the live face detector 1330 are integrated. The access device 1200, the access controller 1300, and the database 1400 can be connected to or be in communication with (collectively "connected to") each other using one or more wired or wireless networks of the network 1500. The architecture 1000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The network 1500 may be, but is not limited to, the Internet, an intranet, a low power wide area network (LP-WAN), a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof.

The secure area 1100 is an area accessible by authenticated and authorized individuals or persons. The secure area 1100 can be an office, factory, vault, cabinet, residence, and the like. The secure area 1100 can contain valuable assets, pharmaceutical drugs, technology, and other like items or objects.

The access device 1200 can be co-located with the secure area 1100 to obtain identification data to authenticate and authorize a person 1600 with a badge 1700 desiring access to the secure area 1100. In implementations, the badge 1700 can include a photo 1710 and a name 1720. The identification data can be images, RFID data, fingerprints, and the like. The images, for example, can include images of the person 1600 and the badge 1700. The access device 1200 can include an image capture device 1210, a data entry pad 1220, and other identifier input mechanisms such as a RFID reader, a fingerprint reader, and the like. The access device 1200 can send captured identification data to the access controller 1300 via the network 1500 for authentication and authorization. The access device 1200 can permit access to the secure area 1100 upon receipt of instructions and/or commands from the access controller 1300.

The access controller 1300 can communicate with the access device 1200 to permit access to the secure area 1100 upon authentication and authorization processing of identification data. In implementations, images or image data from the image capture device 1210 are processed by the access controller 1300.

The authentication and authorization unit 1310 authenticates and authorizes a person by comparing the identification data to control identification data in the database 1400. In implementations, the identification data is obtained from captured image data using the classifier 1320. In implementations, the identification data includes facial identification data of the person 1600 and badge identification data which includes badge facial identification data (the photo 1710) and name identification data (name 1720). The image data containing the facial identification data is processed by the live face detector 1330 to determine that the facial identification data is from a live individual and then the classifier 1320 uses the facial identification data to identify a person from the database 1400. The badge facial identification data is processed by the classifier 1320 to identify a person from the database 1400. The authentication and authorization unit 1310 uses the name identification data to identify a person from the database 1400. The authentication and authorization unit 1310 checks for a match between the person identified from the badge facial identification data and the name identification data and then checks for a match between the person identified from the facial identification data and the badge identification data. The authentication and authorization unit 1310 confirms the person has access rights to the secure area 1100. The authentication and authorization unit 1310 checks for tailgaters, i.e., individuals trying to follow the authenticated and authorized person.

Figure 3:
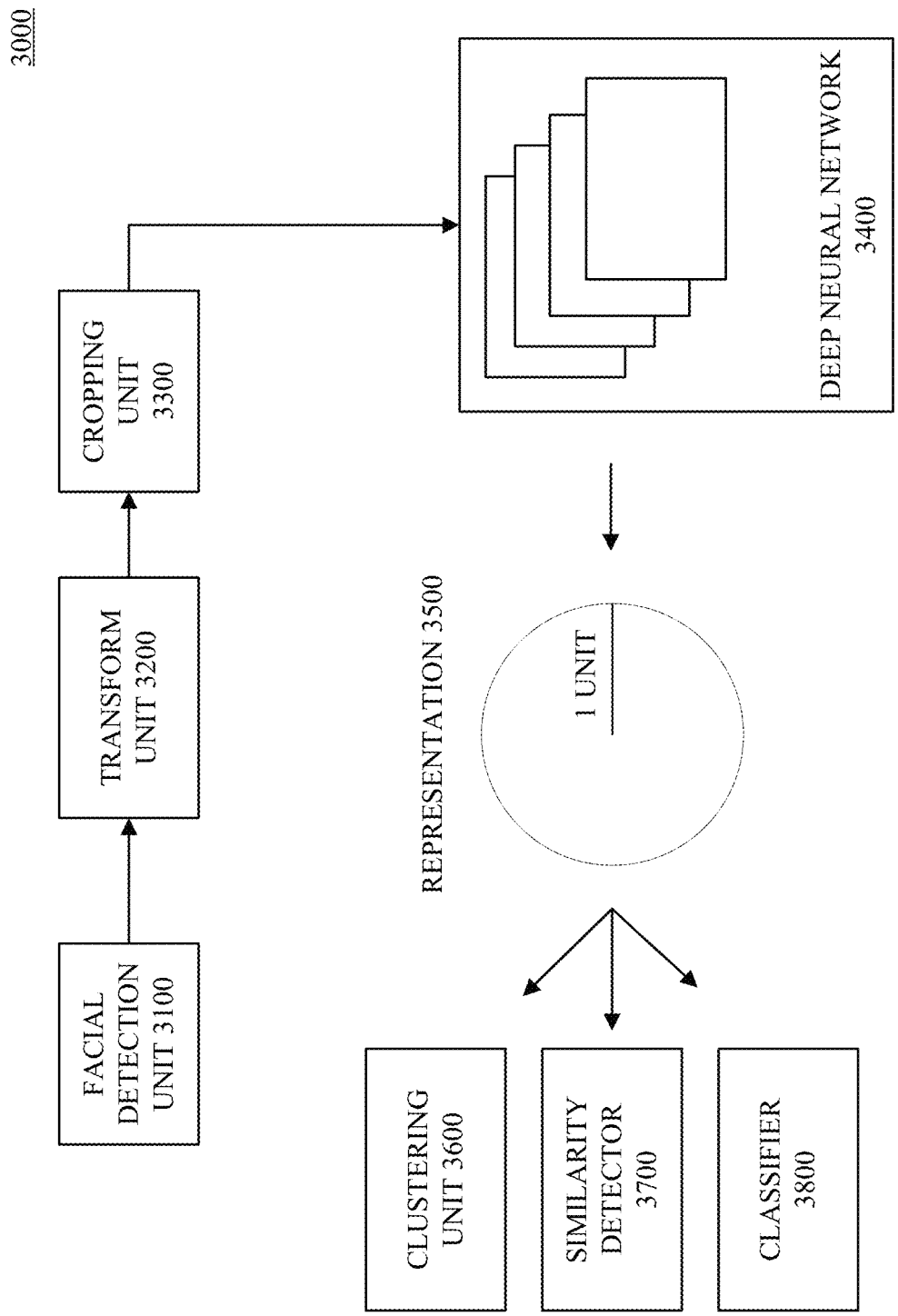
FIG. 3 is a diagram of a classifier framework in accordance with embodiments of this disclosure.

The classifier 1320 can be a face recognition application and framework implemented and trained using deep neural networks such as OpenCV and as described with respect to FIG. 3. Other implementations can be used as is known to those of skill in the art.

Figure 2B:
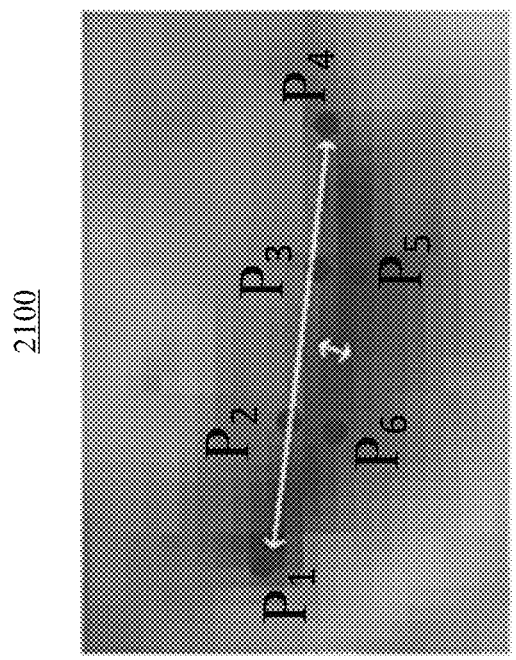
FIG. 2B is a diagram of a closed eye with eye landmarks.
Figure 2A:
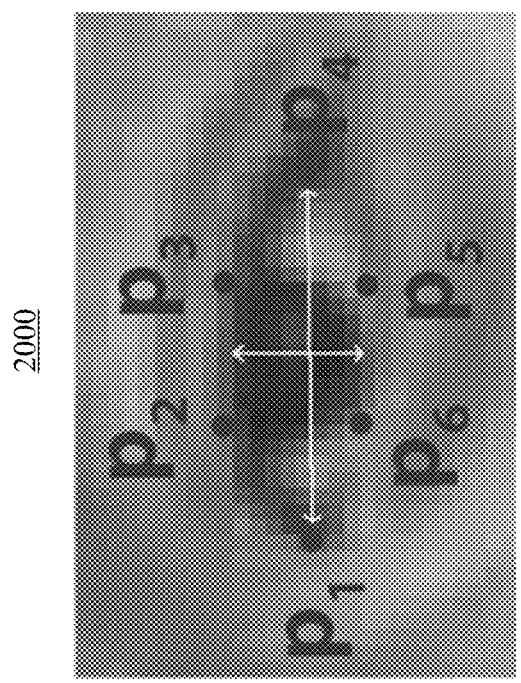
FIG. 2A is a diagram of an open eye with eye landmarks.

The live face detector 1330 can determine whether the captured image data is from a live human face. The live face detector 1330 can track eye movements and eyelid blinking from the captured image data. In implementations, an eye aspect ratio (EAR) can be determined for the contours of the eye. In implementations, eye landmarks can be tracked to determine eye movement. FIG. 2A is a diagram of an open eye 2000 with eye landmarks $P_1$, $P_2$, $P_3$, $P_4$, $P_5$, and $P_6$ and FIG. 2B is a diagram of a closed eye 2100 with the eye landmarks $P_1$, $P_2$, $P_3$, $P_4$, $P_5$, and $P_6$. As shown, the eye landmarks $P_1$, $P_2$, $P_3$, $P_4$, $P_5$, and $P_6$ change depending on whether the eye is open or closed.

The database 1400 can include identification control data such as names, facial photographs, and the like for use by the classifier 1320 and the authentication and authorization unit 1310.

FIG. 3 is a diagram of a detection and recognition framework 3000 in accordance with embodiments of this disclosure. The detection and recognition framework 3000 includes a facial detection unit 3100 which uses trained models to detect a face from captured image data. A transformation unit 3200 tries to make the eyes and bottom lip appear in the same location on each image and a cropping unit 3300 crops to the detected face image data. The output of the cropping unit 3300 is fed to a deep neural network 3400, which represents (or embed) the detected face on a 128-dimensional unit hypersphere 3500. The embedding representation is processed by a clustering unit 3600, a similarity detector 3700, and a classifier 3800 to complete the face recognition. In implementations, the facial identification data and the badge facial identification data can be processed through the detection and recognition framework 3000 for person identification.

Figure 4:
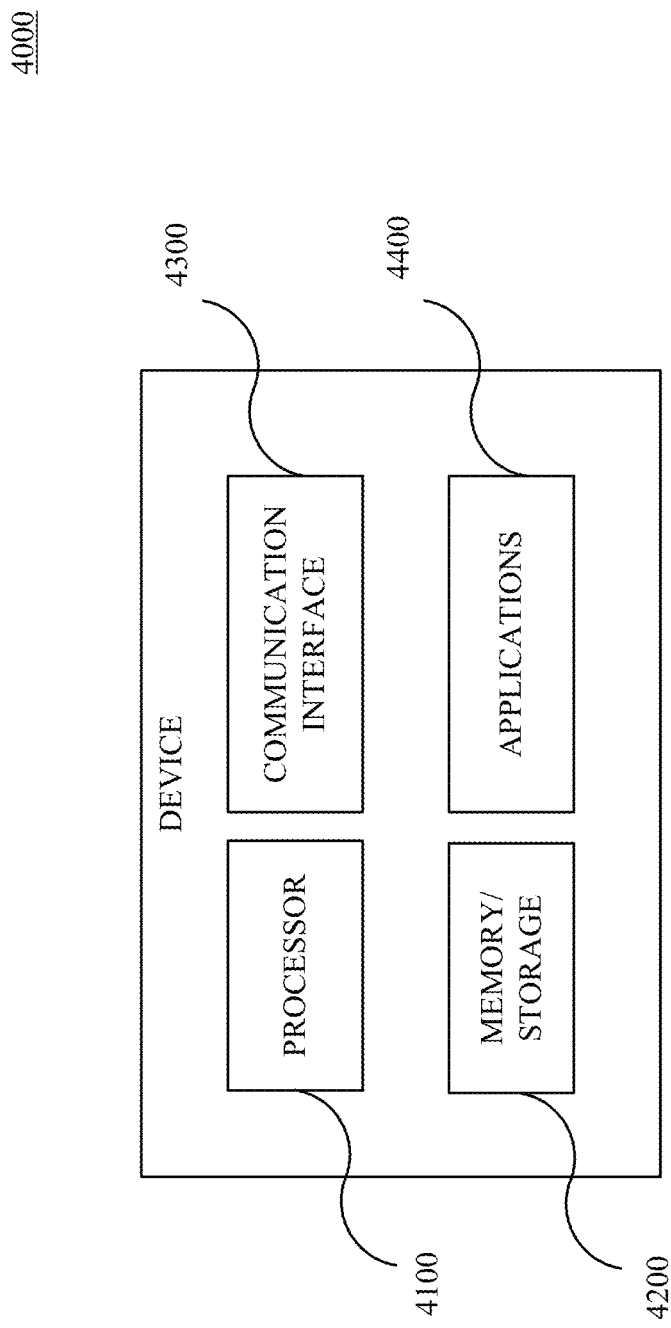
FIG. 4 is a block diagram of an example of a device in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, and applications 4400. The device 4000 may include or implement, for example, the access device 1100, the access controller 1200, the authentication and authorization unit 1310, the classifier 1320, the live face detector 1330, the database 1400, and the framework 3000, for example. In an implementation, appropriate memory/storage 4200 may store the identification data, the image data, the processed image data, the identification control data, and the like. In an implementation, appropriate memory/storage 4200 is encoded with instructions for at least authentication, authorization, face detection, face recognition, character recognition, and the like. The instructions can further include programmed instructions for performing one or more of analysis via deep neural networks and deep learning analysis. The authentication and authorization techniques or methods, the face detection and recognition techniques or methods, and the character recognition techniques or methods described herein may be stored in appropriate memory/storage 4200 and executed by the appropriate processor 4100 in cooperation with the memory/storage 6200, the communications interface 4300, and applications 4400, as appropriate. The device 4000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 5:
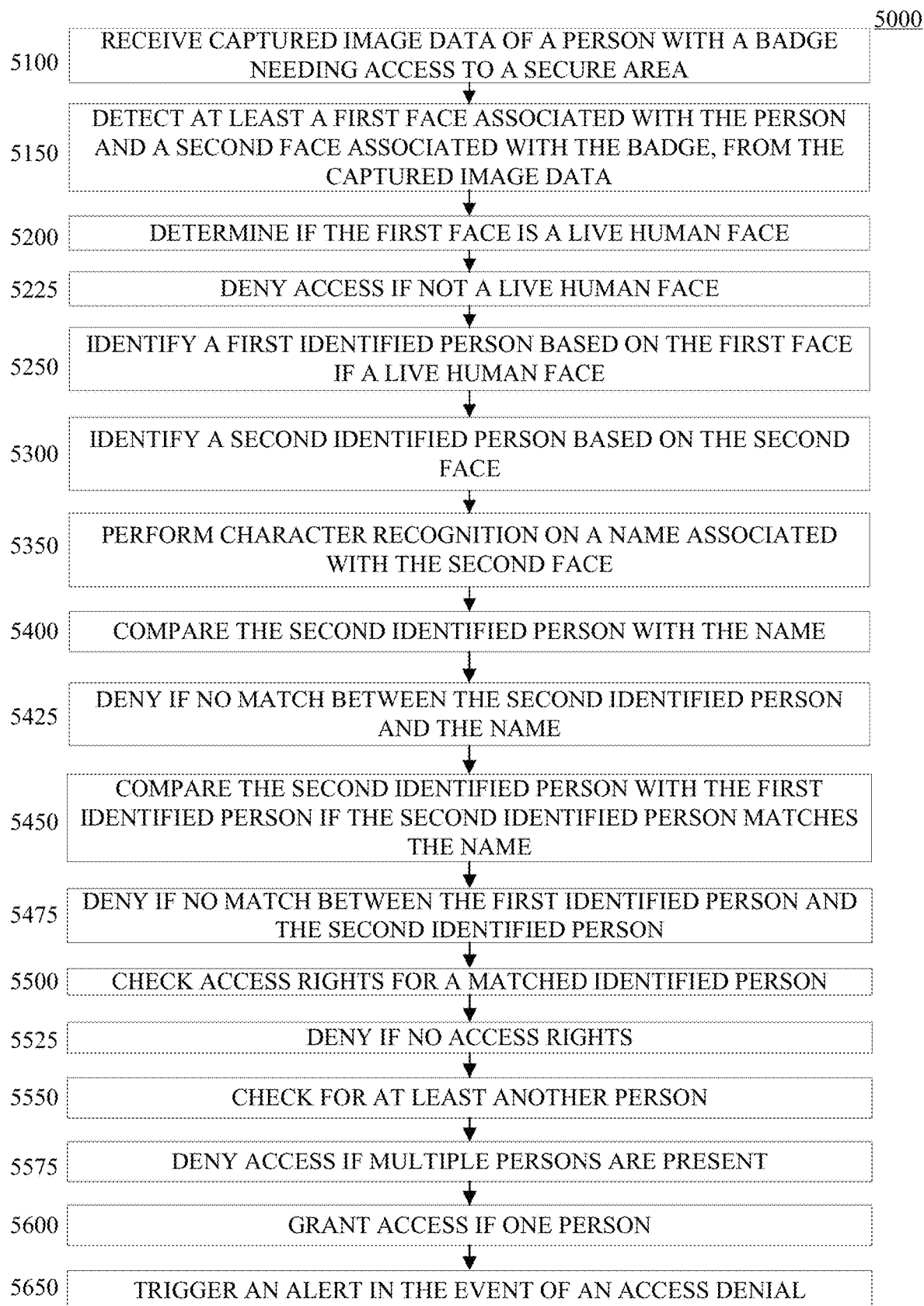
FIG. 5 is a flowchart of an example method for multifactor authentication and authorization in accordance with embodiments of this disclosure.

FIG. 5 is a flowchart of an example method 5000 for authentication and authorization in accordance with embodiments of this disclosure. The method 5000 includes: receiving 5100 captured image data of a person with a badge needing access to a secure area; detecting 5150 at least a first face associated with the person and a second face associated with the badge, from the captured image data; determining 5200 if the first face is a live human face; denying 5225 access if not a live human face; identifying 5250 a first identified person based on the first face if a live human face; identifying 5300 a second identified person based on the second face; performing 5350 character recognition on a name associated with the second face; comparing 5400 the second identified person with the name; denying 5425 if no match between the second identified person and the name; comparing 5450 the second identified person with the first identified person if the second identified person matches the name; denying 5475 if no match between the first identified person and the second identified person; checking 5500 access rights for a matched identified person; denying 5525 if no access rights; checking 5550 for at least another person; denying 5575 access if multiple persons are present; granting 5600 access if one person; and triggering 5650 an alert in the event of an access denial. For example, the method 5000 may be implemented, as applicable and appropriate, by the architecture or system 1000 of FIG. 1, the access device 1100 of FIG. 1, the access controller 1200 of FIG. 1, the authentication and authorization unit 1310 of FIG. 1, the classifier 1320 of FIG. 1, the live face detector 1330 of FIG. 1, the database 1400 of FIG. 1, and the framework 3000 of FIG. 3, and the processor 4100 of FIG. 4.

The method 5000 includes receiving 5100 captured image data of a person with a badge needing access to a secure area. An access device having a video camera captures image data from the person with the badge and sends the image data to an access controller. In implementations, the access device can obtain other identification data including fingerprints, identification codes, and the like.

The method 5000 includes detecting 5150 at least a first face associated with the person and a second face associated with the badge, from the captured image data. A classifier processes the captured image data to detect faces. In implementations, there is a face associated with the person and a face associated with a photo on the badge.

The method 5000 includes determining 5200 if the first face is a live human face. A live face detector tracks eye movements, eye blinks, and other fluctuations to determine if first face is associated with a live human face. In implementations, blood flow in the eye can be tracked. Other techniques can be used which are known to those of skill in the art.

The method 5000 includes denying 5225 access if not a live human face. The authentication and authorization stops if a live person is not present at the access device.

The method 5000 includes identifying 5250 a first identified person based on the first face if a live human face. The classifier performs facial recognition using the first face and faces in a database to identify a first person and a name. In implementations, this is a first level authentication.

The method 5000 includes identifying 5300 a second identified person based on the second face. The classifier performs facial recognition using the second face and the faces in the database to identify a second person and a name. In implementations, this is a second level authentication.

The method 5000 includes performing 5350 character recognition on a name associated with the second face. A character recognition unit determines a name on the badge. In implementations, this is a third level authentication.

The method 5000 includes comparing 5400 the second identified person with the name. The name from the second identified person and the name from the badge are compared. In implementations, this is a fourth level authentication.

The method 5000 includes denying 5425 if no match between the second identified person and the name.

The method 5000 includes comparing 5450 the second identified person with the first identified person if the second identified person matches the name. In implementations, this is a fifth level authentication.

The method 5000 includes denying 5475 if no match between the first identified person and the second identified person.

The method 5000 includes checking 5500 access rights for a matched identified person. An authenticated person requires access rights to the secure area.

The method 5000 includes denying 5525 if no access rights.

The method 5000 includes checking 5550 for at least another person. The access controller determines if there is more than one person near the access device. In implementations, this can be determined from the captured image data. In implementations, the access device can have sensors to detect how many people are present and communicate same to the access controller.

The method 5000 includes denying 5575 access if multiple persons are present. Access is denied to all persons including an authenticated and authorized person if there is more than one person present at the access device.

The method 5000 includes granting 5600 access if one person. The secure area is unlocked for use or access by the authenticated and authorized person.

The method 5000 includes triggering 5650 an alert in the event of an access denial. In the event of an access denial for any reason, an alarm can be triggered at the access device, at the access controller, or combinations thereof.

In general, a method for multifactor authentication and authorization includes receiving captured image data of a person with a badge needing access to a secure area, detecting at least two faces from the captured image data, identifying a first name based on matching a face associated with a live human face with a control face in a database, identifying a second name based on matching on another face associated with the badge with a control face in a database, performing character recognition on text associated with the another face, comparing the second name with the character recognized text, comparing the second name with the first name when the second name and the character recognized text match, checking access rights for a matched name, checking for at least another person in a proximity of the secure area when the person has access rights for the secure area, and granting access when the person is sole person accessing the secure area. In implementations, the method further includes determining whether the face is associated with the live human face, and denying access when the face is not associated with the live human face. In implementations, the determining further includes tracking at least one of eye movements or eye blinks based on relationship between eye landmarks. In implementations, the method further includes denying access when the second name and the character recognized text do not match. In implementations, the method further includes denying access when the first name and the second name do not match. In implementations, the method further includes denying access if the matched name has no access rights. In implementations, the method further includes denying access when multiple persons are present in the proximity of the secure area. In implementations, the proximity of the secure area is a defined zone.

In general, a method for multifactor authentication and authorization includes receiving a video stream of an individual carrying a badge needing access to a controlled site, performing, by comparing with identity data in a database, a first level authentication on a detected face determined to be a live human face, performing, by comparing with the identity data in a database, a second level authentication on a detected face determined from the badge, performing a third level authentication on character recognized text from the badge, performing a fourth level authentication using outputs from the second level authentication and the third level authentication, performing a fifth level authentication using outputs from the first level authentication and the fourth level authentication, performing authorization review of the individual, and granting access to the individual upon passing of the fifth level authentication and the authorization review when other individuals are unable to access the controlled site using the individual's access grant. In implementations, the method further includes determining whether the face associated with the first level authentication is associated with the live human face, and denying access when the face associated with the first level authentication is not associated with the live human face. In implementations, the determining further includes tracking at least one of eye movements or eye blinks based on relationship between eye landmarks to determine if the detected face is a live human face. In implementations, the method further includes denying access when the first level authentication fails. In implementations, the method further includes denying access when the second level authentication fails. In implementations, the method further includes denying access when the third level authentication fails. In implementations, the method further includes denying access when the fourth level authentication fails. In implementations, the method further includes denying access when the fifth level authentication fails. In implementations, the method further includes denying access when the authorization review fails.

In implementations, the method further includes denying access when multiple persons can access the controlled site with the individual's access grant.

In general, a multifactor authentication and authorization system includes an access device proximate a restricted access area, the access device including at least a video camera, a database configured to store identities, and an access controller connected to the access device and the database. The access controller configured to receive a video stream from the access device, detect a first face associated with a person and a second face associated with a badge carried by the person, match the first face with a first identity from the database when the first face is a live human face, match the second face with a second identity from the database, match a character recognized name from the badge with the second identity, match the first identity with the second identity when the character recognized name matches the second identity, check access rights for a matched identity, check for multiple people in the restricted access area, and grant access when the person has access rights and can access the restricted access area with no other people. In implementations, the access controller further configured to determine whether the first face is associated with the live human face by tracking at least one of eye movements or eye blinks based on geometry between eye landmarks, and deny access when the first face is not associated with the live human face.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for multifactor authentication and authorization, the method comprising:
   detecting a live human face from image data of a person carrying a picture identification, the person needing security access;
   identifying a name based on matching the live human face with a control face in a database;
   identifying another name based on matching a face associated with the picture identification with a control face in the database;
   performing character recognition on text present in the picture identification;
   comparing the name, the another name, and the character recognized text for a match; and
   checking access rights for a matched name.

2. The method of claim 1, the method further comprising:
   denying access when the face and the live human face are unassociated.

3. The method of claim 1, the method further comprising:
   denying access when the another name and the character recognized text do not match.

4. The method of claim 1, the method further comprising:
   denying access when at least one two of the name, the another name and the character recognized text do not match.

5. The method of claim 1, the method further comprising:
   determining if the live human face is live by tracking at least one of eye movements or eye blinks based on relationship between eye landmarks.

6. The method of claim 1, the method further comprising:
   denying access if the matched name has no access rights.

7. The method of claim 6, the method further comprising:
   denying access when multiple persons are detected in the proximity of the secure area.

8. The method of claim 7, wherein the proximity of the secure area is a defined zone.

9. A method for multifactor authentication and authorization, the method comprising:
   receiving a video stream of an individual carrying a badge needing access to a controlled site;
   performing, by comparing with identity data in a database, a first level authentication on a detected face determined to be a live human face;
   performing, by comparing with the identity data in a database, a second level authentication on a detected face determined from the badge;
   performing a third level authentication on character recognized text from the badge;
   performing a fourth level authentication using outputs from the second level authentication and the third level authentication;
   performing a fifth level authentication using outputs from the first level authentication and the fourth level authentication; and granting access to the individual upon passing of the fifth level authentication.

10. The method of claim 9, the method further comprising:
determining whether the face associated with the first level authentication is associated with the live human face; and
denying access when the face associated with the first level authentication is not associated with the live human face.

11. The method of claim 10, wherein the determining further comprising:
tracking at least one of eye movements or eye blinks based on relationship between eye landmarks to determine if the detected face is a live human face.

12. The method of claim 9, the method further comprising:
denying access when the first level authentication fails.

13. The method of claim 9, the method further comprising:
denying access when the second level authentication fails.

14. The method of claim 9, the method further comprising:
denying access when the third level authentication fails.

15. The method of claim 9, the method further comprising:
denying access when the fourth level authentication fails.

16. The method of claim 9, the method further comprising:
denying access when the fifth level authentication fails.

17. The method of claim 9, the method further comprising:
denying access when the authorization review fails.

18. The method of claim 9, the method further comprising:
denying access when multiple persons can access the controlled site with the individual's access grant.

19. A multifactor authentication and authorization system comprising:
an access device proximate a restricted access area, the access device including at least a video camera;
a database configured to store identities; and
an access controller connected to the access device and the database, the access controller configured to:
receive a video stream from the access device;
detect a first face associated with a person and a second face associated with a badge carried by the person;
match the first face with a first identity from the database when the first face is a live human face;
match the second face with a second identity from the database;
match a character recognized name from the badge with the second identity;
match the first identity with the second identity when the character recognized name matches the second identity;
check access rights for a matched identity; and
grant access when the person has access rights to access the restricted access area.

20. The system of claim 19, the access controller further configured to:
determine whether the first face is associated with the live human face by tracking at least one of eye movements or eye blinks based on geometry between eye landmarks; and
deny access when the first face is not associated with the live human face.

\* \* \* \* \*